MONITOR-CONVERTER SYSTEM

Filed Dec. 30, 1960 2 Sheets-Sheet 1

INVENTOR
HERBERT HELLERMAN

BY Sughrue, Rothwell, Mion & Zinn
ATTORNEYS

Oct. 13, 1964 H. HELLERMAN 3,153,142

MONITOR-CONVERTER SYSTEM

Filed Dec. 30, 1960 2 Sheets-Sheet 2

United States Patent Office 3,153,142
Patented Oct. 13, 1964

3,153,142
MONITOR-CONVERTER SYSTEM

Herbert Hellerman, Yorktown Heights, N.Y., assignor to International Business Machines Corporation, New York, N.Y., a corporation of New York
Filed Dec. 30, 1960, Ser. No. 79,864
6 Claims. (Cl. 235—154)

Figure 1:
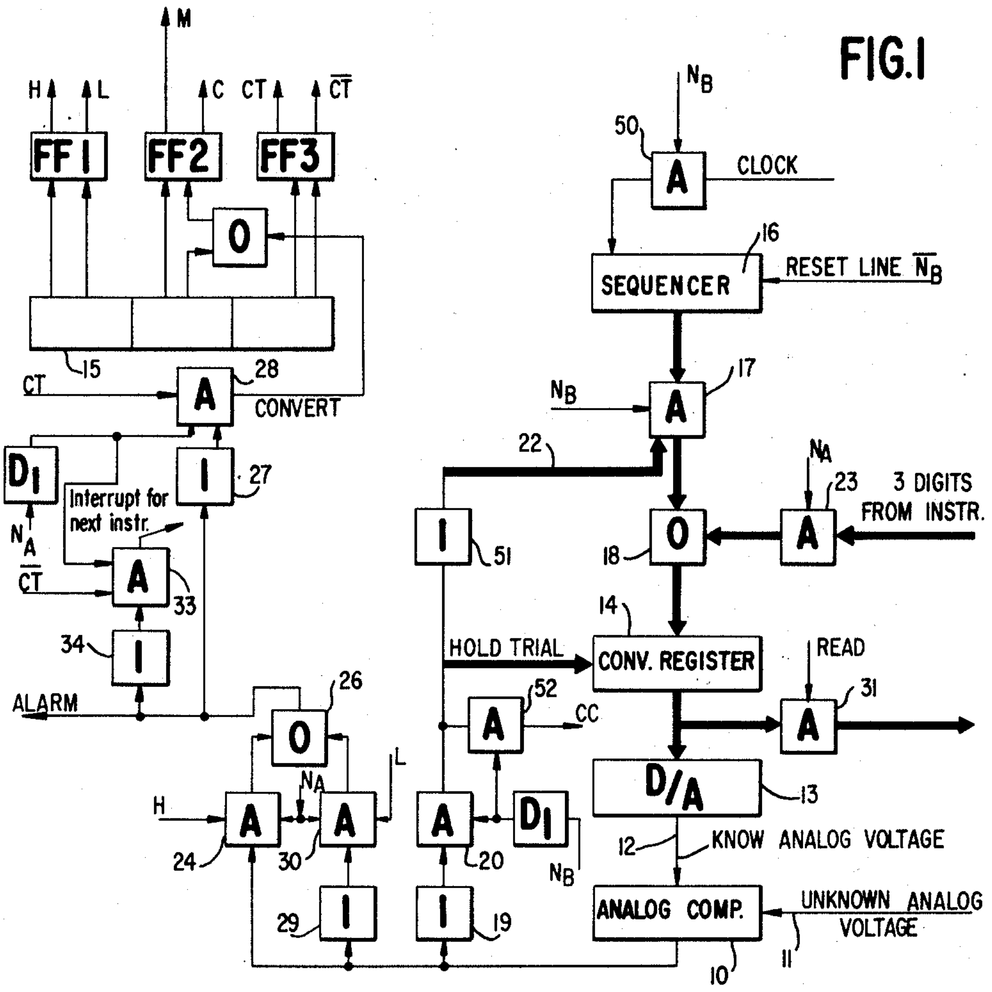

This invention relates to an analog-to-digital converter system and more particularly to an analog-to-digital converter system selectively operable to compare an unknown analog voltage with a limit number, to convert an unknown analog voltage to a digital representation thereof, and to perform both of these operations consecutively when a predetermined relationship exists between the unknown analog voltage and the limit number.

In the present state of the art there are many large scale computers effective to process a great amount of information in a rapid and efficient manner. In general, most multi-purpose computers operate upon information in digital form, i.e., information represented by the presence or absence of one or more datum pulses. However, a great deal of useful information is obtained in analog form and to process this analog information in multi-purpose digital computers, it is necessary to convert the analog information into digital form.

To accomplish this object a number of analog-to-digital converters have been designed employing both mechanical and electronic components. Further refinements in the design of these converters have resulted in higher accuracy and greater speed being obtained. However, a finite conversion time is generally required, resulting from the fact that the digital representation in the converter must be adjusted in predetermined increments to the value of the analog function to be converted or, alternatively, the digital representation is sequenced through its range of values until equality is obtained between the digital representation and the analog function. When a digital computer system employing an analog-to-digital converter system is operated in conjunction with a large number of analog input terminals, this finite analog-to-digital conversion time places a limit on the time necessary to service these terminals.

In accordance with the present invention, novel circuitry is included in an analog-to-digital conversion system, whereby the time necessary for the computer to service the number of analog input terminals can be materially reduced, independent of the actual analog-to-digital conversion time. This advantage is obtained by providing from the computer itself, limit numbers for selected terminals and operating the analog-to-digital converter system in such a way as to provide an indication of whether or not the analog input voltage is within the limit obtained from the computer system. This comparison operation is applied to certain ones of the terminals where it is not necessary in the system operation for the computer to be fed with the digital representation of the analog input; rather system operation continues, provided only that the analog input is within the selected limit. Additionally, means are provided for certain others of the terminals to develop the digital representation of the analog input. Further, for those analog system input voltages which are within the limit number provided by the computer, means are selectively operable to provide the digital representation corresponding to the unknown analog input.

The operation of the analog-to-digital converter system to either compare the analog input signal with a limit number stored in the computer, converting the analog input signal to a digital representation thereof, or both, is under control of bits stored in a computer instruction. However, the comparing and/or converting is done separately from and simultaneously with the execution of routine computer program steps. At the conclusion of a conversion or compare and conversion operation, a computer interrupt line is energized to provide for the transmission of the digital representation or to change the sequence of computer instructions if an out-of-limit condition has been detected. Alternatively, at the end of a comparison operation, where the analog input voltage is within the limit provided from the computer memory, provision is included for the analog-to-digital converter system to request the computer to service another analog terminal.

The limit number is supplied by an instruction withdrawn from the computer memory. This number is supplied both as to the amount and the type of limit involved. By the latter is meant that one type of instruction may demand a comparison between the limit number and the unknown analog voltage and a conversion of the unknown may be undertaken provided that the unknown voltage is less than the limit. This is called a high-compare operation. Another instruction provides for converting the unknown analog voltage into its corresponding digital representation provided that the unknown analog voltage is greater than the limit number. This is called a low-compare type of operation. Consequently, the present invention provides circuitry by which the above-identified comparison is selectively made and provides for the further conversion of the unknown analog input voltage provided the relationship dictated by the instruction is achieved. In the absence of this relationship a second type of signal is provided which may operate alarm circuitry.

It is therefore an object of the present invention to provide a system for converting an unknown analog voltage into a digital representation thereof provided the unknown bears a predetermined relationship to a limit analog voltage; and to force a change in computer instruction sequencing (interrupt) if the relationship is not satisfied.

It is a more specific object of the present invention to achieve this conversion responsive to a condition in which the unknown analog voltage is higher than a limit analog voltage or lower than the limit analog voltage depending upon the demands of the predetermined relationship.

These and other objects will become apparent from a more detailed description of the accompanying drawing.

Figure 2:
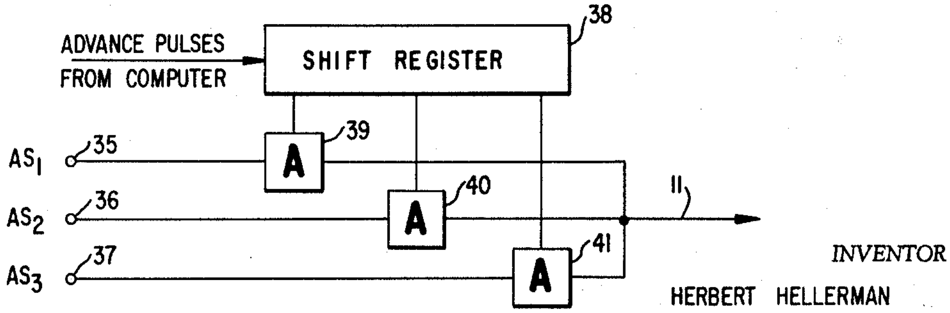
Figure 3:
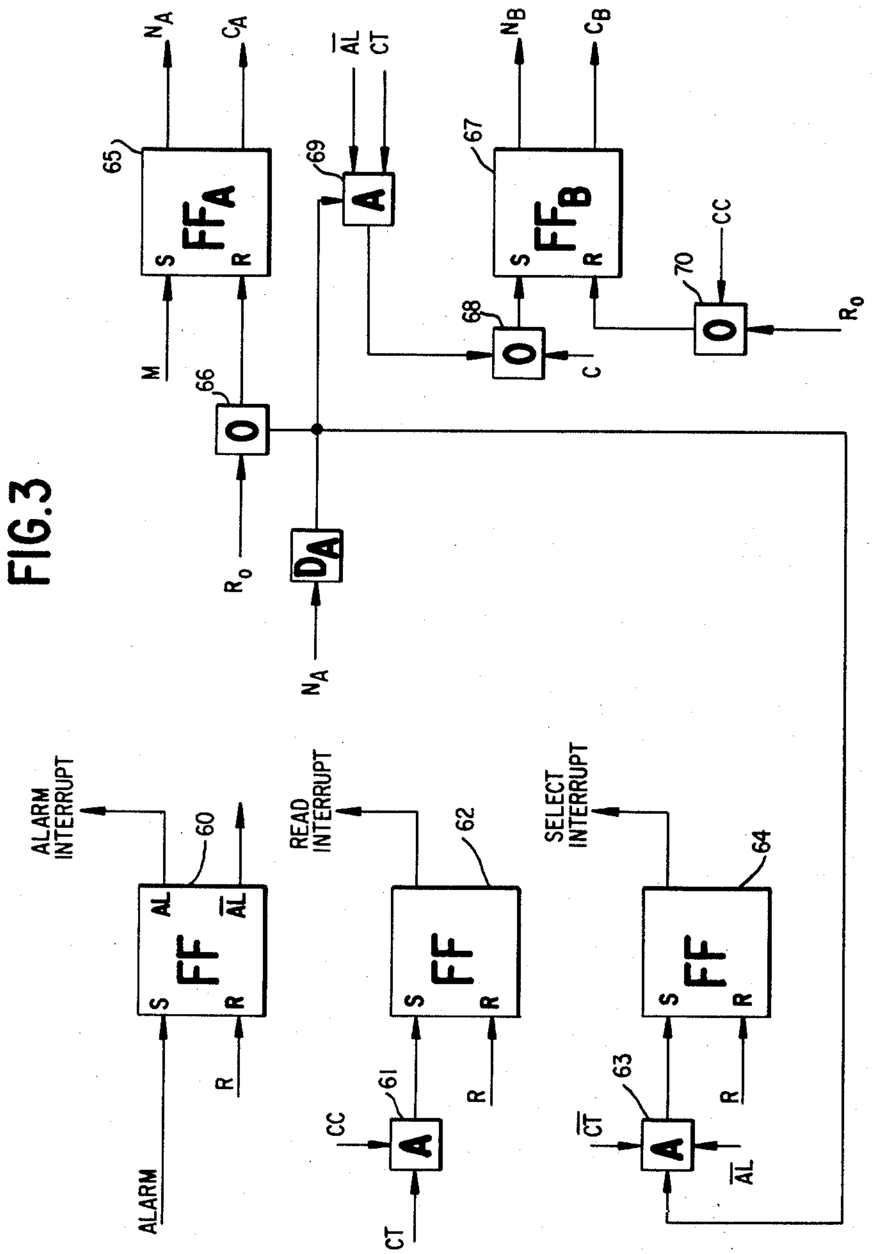

In the drawing:

FIGURE 1 is a diagrammatic representation of one form of the invention illustrating means by which an unknown analog voltage is compared to a digital limit number supplied by the computer and, under certain circumstances, converted into a digital representation thereof; and FIGURE 2 is a diagrammatic representation of one means for accommodating a plurality of such unknown voltages; and FIGURE 3 is a diagrammatic representation of one means of generating various signals used for timing the present system.

Referring to FIGURE 1 accompanying this specification, the numeral 10 identifies an analog comparator. This comparator functions to compare an unknown analog voltage on the input 11 to a known analog voltage on the input 12. The known analog voltage is supplied by the digital-to-analog converter 13. The particular value of the analog voltage supplied by the digital-to-analog converter is determined by the content of the converter register 14. This is a multi-digit register and as shown here contains three digit positions.

An instruction register is identified by numeral 15. Shown here are only those digit positions necessary to provide the controls for the conversion and compare operations. The three digit positions of the instruction register control the states of three flip-flops identified as FF1, FF2, and FF3. FF1 flip-flop is the high-low flip-flop, FF2 is the monitor-convert flip-flop and FF3 is the convert type non-convert type flip-flop. The signals provided by these flip-flops are indicated at the outputs thereof as H (high), L (low), M (monitor), C (convert) and CT (convert type). These signals are used to condition or de-condition various AND gates throughout the circuit as indicated in this figure.

Numeral 16 indicates a sequencer which may be a counter having multiple digit positions therein. During a simple convert operation this sequencer is originally reset to zero. Clock pulses provided by a source (not shown) step the sequencer. The count of sequencer is passed through the AND gate 17 and the OR gate 18 to the convert register. The broad hatched lines indicate identical multiple bit elements and connections. This stores a number in digit form in the convert register. This number is then converted into an analog voltage by any standard means and supplied as the known analog voltage to the analog comparator. In the event that the known analog is below the value of the unknown analog input voltage to line 11 then the output of the analog comparator is considered to be positive. If the known analog voltage to the analog converter is higher than the analog input supplied on line 11 then the output of the analog comparator is negative.

There are five modes of operation which can be achieved by the present circuitry. These are identified as:

Input-select convert (ISC)
Input-select high-compare convert (ISHC)
Input-select high-compare non-convert (ISHN)
Input-select low-compare convert (ISLC)
Input-select low-compare non-convert (ISLN)

The states of the three flip-flops FF1, FF2 and FF3 for each of these are shown in the following table:

| | FF1 | FF2 | FF3 |
|---|---|---|---|
| ISC | H | C | CT |
| ISHC | H | M | CT |
| ISHN | H | M | $\overline{CT}$ |
| ISLC | L | M | CT |
| ISLN | L | M | $\overline{CT}$ |

*Input-Select-Convert (ISC)*

The purpose of this cycle is to convert an incoming analog voltage applied via lead 11 into a digital representation as expressed by digits contained in the converter register 14. The source of the analog input to lead 11 may be selected by certain digits within the instruction in stages of the instruction register 15, not shown but presumed to be present. In addition, the *Op* code contained in the pre-disclosed stages of register 15 determines the nature of the operation, which in this case, requires that flip-flop FF2 be set so that an output is derived from its C lead. Upon so setting FF2 to its C state, the signal $N_B$ is generated (FIGURE 3). This conditions AND gate 50 to permit the clock pulses to advance the sequencer 16. After each counting step has been accomplished in the sequencer 16, the modified number is transferred via AND gates 17 and OR gates 18 into the converter register 14 whereupon the D/A circuit 13 derives an analog trial voltage whose magnitude represents the digital value of the number in the converter register. This trial analog voltage appearing on conductor 12 is compared with the analog input on conductor 11 in the analog comparator 10. As before mentioned, a trial analog voltage less than the analog input results in a positive signal appearing from the output of comparator 10. Assuming now that the analog input in the present example is greater than zero, the initial count of zero transferred from sequencer 16 into converter register 14 will result in a zero trial analog voltage which in turn creates a positive output from comparator 10. This positive signal is inverted by inverter 19 whose output is connected to AND circuit 20. At this particular time the output of AND circuit 20 is down. Inverter 51 continues to condition AND gate 17. Therefore, the next succeeding clock pulse will increment the number in sequencer 16 by 1, after which this incremented number from sequencer 16 is transferred into converter register where a corresponding analog voltage is derived therefrom. Thus, the maintenance of a positive signal from comparator 10 as long as the trial analog voltage remains less than the analog input voltage, will result in sequencer 16 being incremented by 1 during each clock pulse time. Upon the trial analog voltage eventually becoming equal to the analog input voltage, a negative signal is derived from comparator 10 which in turn is inverted to a positive signal by inverter 19 and passed to AND circuit 20, conditioning said AND gate. $N_B$ is applied to delay $D_1$ (delay equal to one period of clock pulses) which now unblocks AND gate 20. The output of AND gate 20 goes up to provide a positive signal. AND gate 52 now provides signal CC (Convert Complete). Inverter 51 now blocks AND gate 17. The CC signal, as will be shown in connection with FIGURE 3, is used so that the computer will subsequently interrupt its current program sequence in order to read from the converter register 14 the digital representation of the analog input voltage. So also this positive signal from AND gate 20 is applied to convert register 14 to hold the digital value of the trial analog equaling the analog on line 11.

*Input-Select High-Compare Convert (ISHC)*

It will be recalled that in the instruction there are three positions which identify the *Op* code. There are also three positions which identify a number in the instruction which is to identify either a high or a low limit analog voltage. Whether it is a high or a low depends upon the *Op* code. In this particular mode of operation we are concerned with the high limit operation. The condition of the three flip-flops as a result of the *Op* code are as follows:

Flip-flop 1 is H.
Flip-flop 2 is M.
Flip-flop 3 is CT at the beginning of the operation.

Since we are here dealing with high compare, if the trial analog voltage is below that of the analog input then the circuit is to provide the alarm interrupt signal. If it is higher than the analog input then the condition of the flip-flop 2 is to be changed so that the effective *Op* code is to provide a convert cycle.

To initiate this operation, the three *Op* code digits from the *Op* code stages of register 15 are transferred into their respective flip-flops FF1, FF2, and FF3. FF2 now generates an M signal, and $N_A$ as later shown, whereby $N_A$ conditions AND gates 23 to receive the three limit digits from the instruction and transfer them to the converter register. When contained in the converter register, these three digits have an analog voltage equivalent generated by unit 13 which compares with the analog input appearing on conductor 11. If the analog input voltage on conductor 11 is higher than the limit contained in converter register 14, then a positive output will appear at the output of comparator 10. This positive output is applied to AND gate 24 in the alarm compare circuit which in turn is conditioned by the H signal appearing from FF1. Therefore, a positive output will appear from AND gate 24 and from OR gate 26. The positive alarm signal appears at the output of OR 26. An ALARM INTERRUPT signal is generated as will be shown in FIGURE 3. This signal may be used to stop or modify the condition of the computer in accordance with the programmers' desires. Furthermore, the presence of a positive signal from OR 26 lowers the output of an inverter 27 so as to prevent the occurrence of a convert signal from AND gate 28. At this point, the ISHC cycle may be terminated.

On the other hand, if the analog input voltage on lead 11 is lower than the high limit trial analog signal appearing from unit 13, or in other words, the analog input is within range, then a negative signal appears from comparator 10. This negative signal will not pass through AND gate 24 so that no AL signal is generated. Instead, the output of OR gate 26 remains at a negative level. The output of inverter 27 goes up to condition AND gate 28 along with the CT signal from FF3. The delayed $N_A$ signal START CONVERT is applied to unblock AND gate 28 which through OR gate 32 triggers FF2 into its C or CONVERT state. In such a case, the occurrence of the C signal begins a convert operation as previously described above because of the presence of the C signal and therefore $N_B$, causing sequencer 16 to begin counting and its incremented numbers transferred to the converter register 14 in sequence. This, therefore, results in trial analog voltages being compared against the analog input and, as described under ISC, ultimately stores a number in digital form in converter register 14 which is the digital equivalent of the analog input on line 11.

*Input-Select High-Compare Non-Convert (ISHN)*

This mode of operation is identical to the first portion of the ISHC mode above described. However, the O*p* code in the instruction register stages 15 does not set FF3 so as to generate a CT signal but rather provides the $\overline{CT}$ signal. In such a case, AND gate 28 is not conditioned to pass a positive signal which in turn prevents FF2 from ever being set into its C state. Therefore, although an alarm interrupt signal may not be generated due to the determination by the analog comparator that the analog input is within the high limit range, no convert cycle is ever initiated. Nonetheless, inverter 34 conditions AND gate 33 along with $\overline{CT}$ signal so as to provide INTERRUPT FOR NEXT INSTRUCTION signal upon occurrence of the delayed $N_A$. This interrupt signal is generated after the comparison cycle is completed.

*Input-Select Low-Compare Convert (ISLC)*

As in the ISHC mode, three limit digits from the instruction word are passed through AND circuit 23 in order to be compared in analog form against analog input to determine if the analog input on line 11 is either below or above the limit signal. In the event that the analog input voltage is out of range, i.e., less than the limit stored in the converter register 14, a negative signal will be generated from comparator 10 which is applied to inverter 29. This in turn generates a positive signal which is gated through AND gate 30 conditioned by $N_A$ and an L signal from FF1 which has been set to that state in response to an O*p* code digit requiring a low limit comparison. A positive output from AND 30 is gated through OR 26 and so generates an alarm (AL) which may affect the system as above described in connection with the ISHC mode. On the other hand, if the analog input voltage on line 11 is greater than the low limit signal, a positive output is generated from comparator 10 which fails to provide an output from OR 26 and so causes a positive output from AND gate 28 which is conditioned by the presence of a CT signal at the time of delayed $N_A$. This in turn sets FF2 from an M state to the C state which initiates the convert time of this particular cycle. The convert time causes sequencer 16 to again operate so as to supply a step wave analog voltage via line 12 to the comparator 10 in order to obtain a digital representation of the analog input.

*Input-Select Low-Compare Non-Convert (ISNC)*

This mode of operation is identical to the first portion of the ISLC, except that the CT signal from FF3 is not present and so prevents the initiation of a convert time if no alarm interrupt signal is generated. However, $\overline{CT}$ is present and the interrupt signal is generated at AND gate 33.

As shown here, the AND gates 31 gate the contents of register 14 to the computer when the READ signal is supplied to said gates.

Referring now to FIGURE 2, there is shown one means by which the system may be sequentially coupled to a plurality of input terminals 35, 36 and 37. To these terminals are applied analog signals $AS_1$, $AS_2$ and $AS_3$. A shift register 38 sequentially conditions the AND gates 39, 40 and 41 under control of the advance pulses supplied to said register from the computer. The output of these three gates sequentially couples the analog signals to line 11 which feeds comparator 10 (FIGURE 1). Under control of the computer, as explained above, these signals may be compared with limit signals stored in the computer memory or compared and converted to digital representations thereof when a predetermined relationship exists between said analog signals and said limit signals. Now referring to FIGURE 3, there is shown diagrammatically one means by which the previously referred to interrupt signals and timing signals may be generated. The alarm signal from the output of OR gate 26 is supplied to the set input of flip-flop 60 to set said flip-flop and provide the ALARM INTERRUPT (AL) signal. In the reset state the $\overline{AL}$ signal is provided.

When AND gate 61 is unblocked by CC and CT the flip-flop 62 is set to provide the READ INTERRUPT signal. When AND gate 63 is unblocked by $\overline{CT}$, $\overline{AL}$ and $N_A$, delayed an amount $D_A$, flip-flop 64 is set to provide SELECT INTERRUPT signal. Flip-flop 65 indicated as $F_A$ is set by M signal to provide $N_A$. It is reset through OR gate 66 to provide signal $C_A$ by the reset signal $R_O$ or the delayed $N_A$. Flip-flop 67, indicated at FFB when set provides $N_B$ and when reset provides $C_B$. It is set either by C through OR gate 68 or the unblocking of AND gate 69. AND gate 69 is unblocked by the delayed $N_A$, $\overline{AL}$ and CT. Flip-flop 67 is reset through OR gate 70 by either CC or $R_O$.

The signals $R_O$ are both reset signals provided by the computer.

The SELECT INTERRUPT signal seeks the computer for the next location in memory wherein is stored the next O*p* code.

What has been described are specific embodiments of the present invention. Other embodiments obvious from the teachings herein are contemplated to be within the spirit and scope of the following claims.

What is claimed is:

1. A system comprising: a digital computer having an addressable memory and a predetermined program routine, a plurality of input terminals, a plurality of analog signals, means coupling each of said signals to one of said terminals, an analog-to-digital converter system, first means responsive to said computer to sequentially couple said converter to each of said terminals, second means responsive to said camputer to selectively control said converter to compare the analog signal at certain ones of said terminals with limit signals stored in said computer memory and to convert the analog signal at certain others of said terminals to the digital representation thereof, said second means being further selectively operable when said analog signals are higher than or lower than said limit signals to control said converter to convert the analog signals to the digital representation thereof, and means coupling said digital representations to said computer.

2. A system as defined in claim 1 wherein said second means includes a compare means, means to feed selected pairs of said limit signals and said analog signals to said compare means for comparison therein, means to generate a relationship signal as a result of said comparison, means responsive to said computer to generate a predetermined relationship signal, means responsive to the generation of a relationship signal consistent with said predetermined relationship signal resulting from comparison of a pair of said limit signals and said analog signals for causing said analog-to-digital converter to convert said analog signal of said pair to a digital representation.

3. A digital computer operable in conjunction with a plurality of analog input terminals and adaptable to service said terminals in sequence by means of a single analog-to-digital converter system, said analog-to-digital converter requiring a finite conversion time to provide the digital representation of each of said plurality of analog inputs, comprising: first means conditioning said converter to compare the analog input at certain ones of said terminals with associated predetermined digital limit numbers stored in said computer; second means conditioning said converter to provide the digital representation of the analog input at certain others of said terminals, and further means conditioning said converter to provide the digital representation of the analog input at said certain ones of said terminals, said further means selectively controllable by said computer and selectively responsive to a higher than or lower than relationship between said analog input and said associated limit number at each of said terminals, whereby the time necessary for said computer to service all of said plurality of terminals is reduced independent of said finite conversion time.

4. A system for converting an unknown analog voltage to a digital representation thereof responsive to a predetermined higher than or lower than relationship between said unknown analog voltage and a limit analog voltage that comprises means to generate said limit analog voltage, means to compare said limit analog voltage and said unknown analog voltage, means responsive to said comparison to selectively generate a first signal indicative of said predetermined relationship and a second signal indicative of the lack of said predetermined relationship and means responsive to said first signal to convert said unknown analog voltage to said digital representation thereof.

5. A system for converting an unknown analog voltage to a digital representation thereof responsive to a predetermined higher than or lower than relationship between said unknown analog voltage and a limit voltage that comprises means to generate said limit analog voltage, means to compare said limit analog voltage and said unknown analog voltage, means responsive to said comparison to selectively generate a first signal indicative of said predetermined relationship and a second signal indicative of the lack thereof, a counter, register to store the count of said counter, means responsive to said first signal to periodically increment the count of said counter, means to convert said counter to analog form to thereby generate a series of incremental analog trial voltages, means to compare each trial analog voltage thus generated with said unknown analog voltage, means to terminate said incrementation of said counter upon equality between said trial analog voltage and said unknown analog voltage whereby said register stores said digital representation to said unknown analog voltage.

6. A system as claimed in claim 5 further including means responsive to said second signal to indicate said lack of said predetermined relationship.

References Cited in the file of this patent

UNITED STATES PATENTS

| | | |
|---|---|---|
| 2,865,564 | Kaiser | Dec. 23, 1958 |
| 3,034,719 | Anfenger et al. | May 15, 1962 |
| 3,036,772 | Pughe et al. | May 29, 1962 |

OTHER REFERENCES

Preliminary Information Release, Analog-Digital Computer Linkage System Type 4.030, Electronics Associates Inc. (Bulletin Release PIR #901-1), 1959.